Aug. 20, 1940.  W. B. FLANDERS  2,211,851
BLADE SHROUDING
Filed March 8, 1939
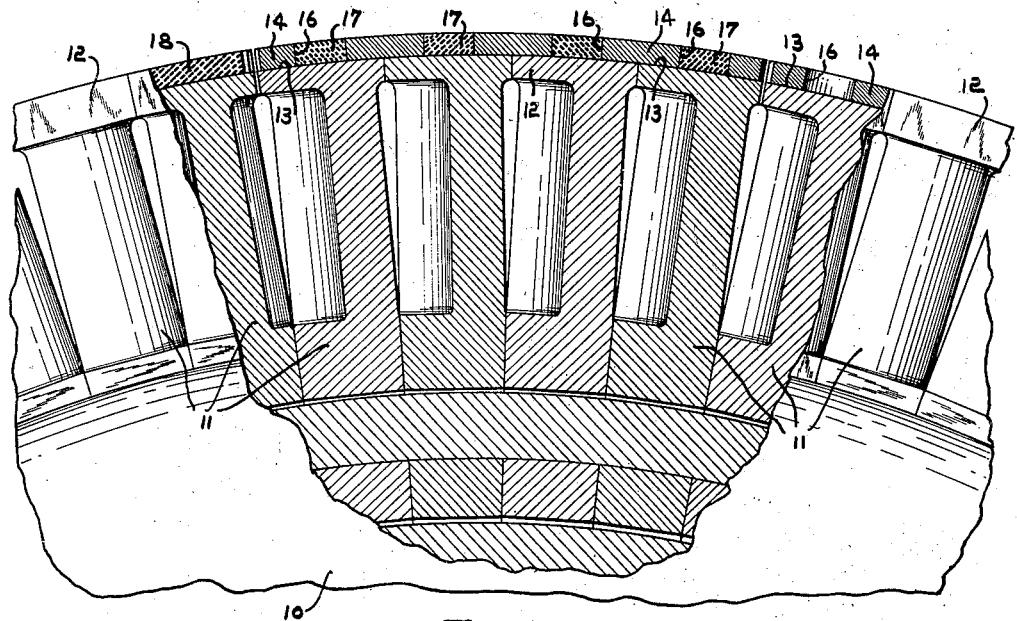
Fig. 1.
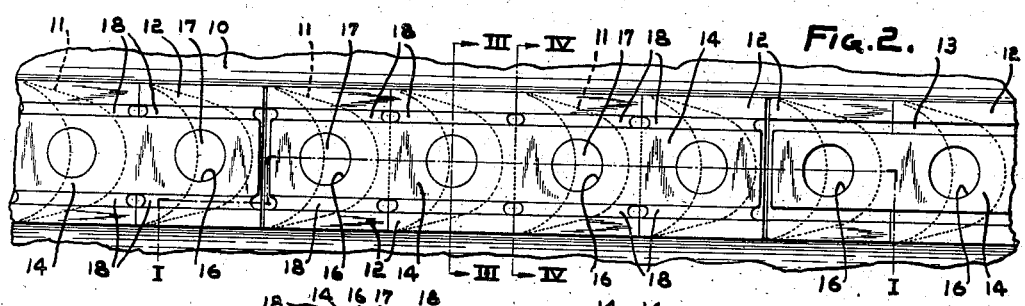
Fig. 2.
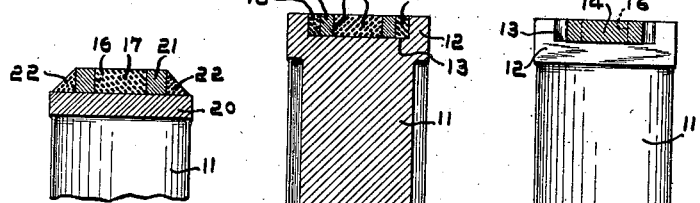
Fig. 5.   Fig. 3.
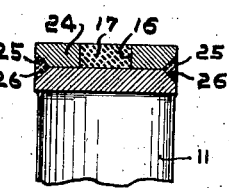
Fig. 6.   Fig. 4.
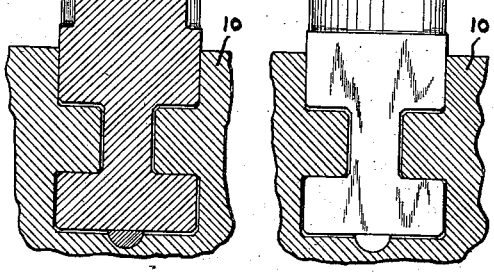
WITNESSES:
INVENTOR
WARREN B. FLANDERS
BY
ATTORNEY

UNITED STATES PATENT OFFICE 2,211,851

BLADE SHROUDING

Warren B. Flanders, Philadelphia, Pa., assignor to Westinghouse Electric & Manufacturing Company, East Pittsburgh, Pa., a corporation of Pennsylvania Application March 8, 1939, Serial No. 260,477

4 Claims. (Cl. 253—77)

The invention relates to elastic fluid turbines, and has for an object the provision of improved turbine blade shrouding which is particularly useful with high-temperature and high-pressure turbines.

Another object of the invention is the provision of turbine blades or vanes having integral spacing pieces at their free ends cooperating to form a shroud, and tie members welded thereto circumferentially thereof at zones where there is minimum likelihood of cracking.

A further object of the invention is the provision of turbine blades or vanes having integral spacing pieces at their free ends cooperating to form a shroud with a circumferentially-extending groove formed in the outer surface of the latter, and tie members in the groove and welded to the spacing pieces at zones where danger of cracking is at a minimum.

These and other objects are effected by the invention as will be apparent from the following description and claims taken in connection with the accompanying drawing forming a part of this application, in which:

Fig. 1 is a side elevational view, with portions thereof broken away along the line I—I of Fig. 2, showing a plurality of blades embodying the invention;

Fig. 2 is a plan view of the structure shown in Fig. 1;

Figs. 3 and 4 are transverse sectional views taken along the lines III—III and IV—IV, respectively, of Fig. 2; and, Figs. 5 and 6 are fragmentary sectional views, similar to those of Figs. 3 and 4, showing modifications of the invention.

Referring now to the drawing more in detail, there is shown a blade-mounting member, such as the turbine rotor 10, carrying a row of blades 11, each blade having, at its free or outer end, an integral spacing piece 12, the spacing pieces cooperating to form a shroud for the blade row. the shroud is provided in its outer face with a circumferentially-extending channel 13 in which is positioned a plurality of tie members 14 of less width than that of the channel and spaced from the side walls of the latter.

The tie members 14 are provided with a plurality of circumferentially-spaced openings 16 aligned with and overlying the centers of the spacing pieces 12. These openings 16 are filled with weld material 17, serving to autogenously connect the tie members with the spacing pieces.

Additional weld metal, as at 18, is provided in the spaces between the tie members 14 and the side walls of the channel 13, this material 18 being limited to zones spaced from the joints between adjacent spacing pieces. (See Fig. 2.)

Figs. 5 and 6 show modified arrangements for welding the tie members to the spacing pieces. In Fig. 5, the spacing pieces 20 are ungrooved and have somewhat narrower circumferentially-extending tie members 21 at their outer ends. Weld metal, as at 22, fills the recesses between the edges of the tie members and the edges of the spacing pieces.

In Fig. 6, the members 24 are of approximately the same width as the spacing pieces, the outer surface of the spacing pieces and the inner surface of the tie members being chamfered at their side edges to provide grooves, at 25, for the reception of weld metal 26.

Previously, it has been attempted to secure tie members to spacing pieces by the use of continuous strips of weld material in spaces between the tie members and channel side walls, but this arrangement is objectionable on account of the tendency of cracks to start at the joints between spacing pieces and to pass entirely through the weld material and into the tie members themselves.

It will be noted that by the arrangements herein disclosed, all weld material is disposed at a substantial distance from the joints between the spacing pieces 12, with the result that the probability of cracking of the weld is materially lessened. Any weakness which might result from elimination of weld material from the zones adjacent the joints is more than compensated for by the additional weld material 17 in the openings 16. These results are found to be of special advantage in constructions where the turbine is operated at high temperatures and pressures, resulting in abnormal strains and stresses on the blades and their shrouding.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In combination with a blade-mounting element, a row of blades mounted on said element, a spacing piece integral with the outer end of each blade, said spacing pieces being disposed circumferentially in end-to-end relation to form a shroud for the row of blades, tie members extending circumferentially of the spacing pieces, each of said tie members having openings overlying the central portion of the respective spacing pieces, and weld metal for autogenously connecting the tie members to the spacing pieces, said weld metal being disposed in said openings and at the sides of the tie members and spaced from the ends of the spacing pieces.

2. In combination with a blade-mounting element, a row of blades mounted on said element, a spacing piece integral with the outer end of each blade, said spacing pieces being disposed circumferentially in end-to-end relation to form a shroud for the row of blades, said shroud having a circumferentially-extending channel formed in its outer surface, tie members of less width than said channel disposed therein and spaced from the side walls thereof, and weld material in the spaces between said tie members and the side walls of the channel for autogenously connecting the tie members to the spacing pieces, said spaces being free of weld material adjacent the ends of the spacing pieces, whereby formation of cracks at these points is avoided.

3. A structure as specified in claim 2, wherein the tie members are provided with spaced openings therethrough overlying the centers of the spacing pieces and filled with weld material autogenously connecting the tie members to the spacing pieces.

4. In the combination with a blade-mounting element, a row of blades mounted on said element, a spacing piece integral with the outer end of each blade, said spacing pieces being disposed circumferentially in end-to-end relation to form a shroud for the row of blades, tie members disposed on the spacing pieces and extending circumferentially thereof, and weld material for autogenously connecting the tie members to the spacing pieces, said weld material being disposed at the edges of the tie members and spaced from the ends of the spacing pieces.

WARREN B. FLANDERS.